United States Patent
Kyogoku et al.

[11] 3,928,421
[45] Dec. 23, 1975

[54] ANTI-GASTRIC ULCER CHALCONE ETHERS

[75] Inventors: Kazuaki Kyogoku, Tokyo; Katsuo Hatayama, Saitama; Sadakazu Yokomori; Teruya Seki, both of Tokyo, all of Japan

[73] Assignee: Taisho Pharmaceutical Co., Ltd., Tokyo, Japan

[22] Filed: June 25, 1974

[21] Appl. No.: 483,004

[30] Foreign Application Priority Data

Oct. 30, 1973 Japan............... 48-12199
Jan. 19, 1974 Japan............... 49-8736
Jan. 19, 1974 Japan............... 49-8737
Feb. 9, 1974 Japan............... 49-16524

[52] U.S. Cl......... 260/479 R; 260/590 D; 424/331; 424/298
[51] Int. Cl.² ............... C07C 69/02; C07C 49/84
[58] Field of Search............ 260/590, 590 D, 479 R

[56] References Cited
OTHER PUBLICATIONS

Giuliana et al., Chem Abst., Vol. 68, page 11066, (1968).
Jain et al., Indian J. of Chem., Vol. 11, pp. 723-725 (1973).
Khanna, et al., Indian J. Vol. Chem., vol. 11, pp. 1225-1227 (1973).

*Primary Examiner*—James O. Thomas, Jr.
*Assistant Examiner*—James H. Reamer
*Attorney, Agent, or Firm*—Wenderoth, Lind & Ponack

[57] ABSTRACT

Novel chalcone ethers of the formula

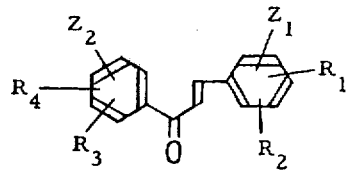

wherein $R_1$, $R_2$, $R_3$ and $R_4$ are independently one selected from the group consisting of hydrogen atom and hydroxy, lower alkyl, lower alkoxy and acyloxy groups, and one of $Z_1$ and $Z_2$ is one selected from the group consisting of the groups represented by the formula (II),

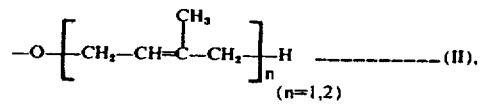

the other of $Z_1$ and $Z_2$ is one selected from the group consisting of the groups represented by the formula (II) and (III)

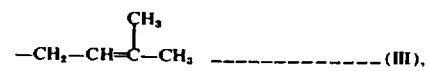

are useful compounds having remarkable anti-gastric ulcer activity and extremely low toxicity.

21 Claims, No Drawings

ANTI-GASTRIC ULCER CHALCONE ETHERS

BACKGROUND OF THE INVENTION

1. Field of the Invention

Synthesized chalcone ethers having anti-gastric ulcer activity.

2. Description of the Prior Art

Various chalcone derivatives are well known previously. These chalcone derivatives are reported to have various uses such as an oxidation inhibitor, radiation absorbent, anti-bacterial substance and sweetening agent.

On the other hand, some chalcone derivatives are reported as a pharmacologically active substance, for example, as analgesic, anti-inflammatory and vasodilator agents.

As far as chalcone derivatives having an anti-gastric ulcer activity, however, there are only a few papers as follows:

Sophoradochromene; Japanese Pat. No. 623498,
2,2', 4,4'-Tetrahydroxy-6'-methoxy-3'-(5-methyl-2-isopropenylhex-4-enyl)-chalcone; Japanese Pat. No. 691783 and
Isoliquiritigenin; Arzneimittel Forschung 17, 1544 (1967).

The above Japanese patents disclose the extracting and isolating method of each compound from plants, said method are, however, always accompanied with some disadvantages such as complicated procedure, low yield and low purity.

BRIEF SUMMARY OF THE INVENTION

This invention relates to novel chalcone ethers. More particularly, this invention concerns with novel chalcone ethers represented by the general formula (I)

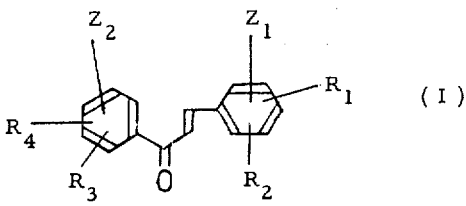

wherein $R_1$, $R_2$, $R_3$ and $R_4$ are independently one selected from the group consisting of hydrogen atom and hydroxy, lower alkyl, lower alkoxy and acyloxy groups, and one of $Z_1$ and $Z_2$ is one selected from the group consisting of the groups represented by the formula (II) and the other of $Z_1$ and $Z_2$ is one selected from the group consisting of the groups represented by the formulae (II) and (III)

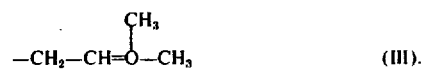

$$-CH_2-CH=\overset{CH_3}{\overset{|}{C}}-CH_3 \qquad (III).$$

In this specification and claims, the term lower alkyl, lower alkoxy and acyloxy groups refer to each group having 1–5 carbon atoms.

The object of the present invention is to provide novel chalcone derivatives possessing excellent anti-gastric ulcer activity together with low toxicity.

A further object of this invention is to provide novel useful chalcone derivatives by simple and convenient preparing procedure, especially by readily applicable procedure to manufacturing production.

The compounds of this invention may be prepared by condensation of substituted acetophenone with substituted benzaldehyde in alkaline or acidic condition followed by thermal rearrangement, if necessary, or by ether formation of substituted chalcone having at least one hydroxy group with alkenyl halide.

The compounds represented by the general formula (I) show remarkable anti-gastric ulcer activity which has not been observed in any other previous known anti-gastric ulcer agents. That is, the compounds of this invention show excellent effect for acetic acid ulcer which is analogous to chronic gastric ulcer as well as for various kinds of gastric ulcers such as stress ulcer, Shay's ulcer and induced ulcers by drugs, for example, aspirin, steroids and other anti-inflammatory agents.

The merits of the compounds of this invention, that is, excellent anti-gastric ulcer activity and extremely low toxicity, are considered to be attributed to the combination of chalcone mother-structure and two substituted groups $Z_1$ and $Z_2$. In other words, the definition that one of $Z_1$ and $Z_2$ is one selected from the group consisting of 3-methyl-2-butenyloxy and 3,7-dimethyl-2,6-octadienyloxy groups, the other of $Z_1$ and $Z_2$ is one selected from the group consisting of 3-methyl-2-butenyloxy, 3,7-dimethyl-2,6-octadienyloxy and 3-methyl-2-butenyl groups is most important factor in this invention. The other substituted groups, $R_1$, $R_2$, $R_3$ and $R_4$ are not so important as said groups $Z_1$ and $Z_2$.

DETAILED DESCRIPTION OF THE INVENTION

The compounds of this invention as defined in the formula (I) can be prepared by the following reaction sequence (1).

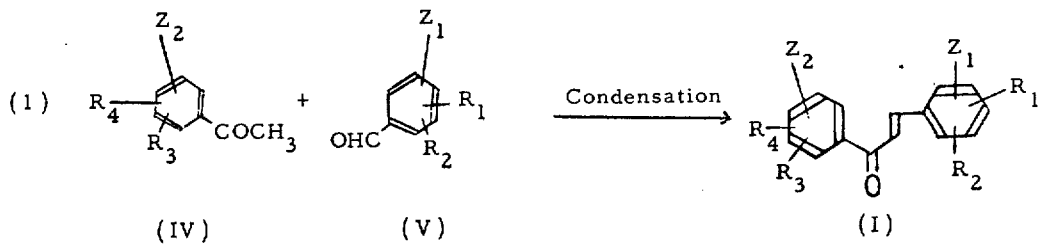

(1)           (IV)         (V)                    (I)

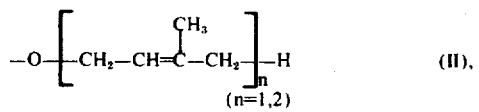

(n=1,2)

In this reaction sequence (1), $Z_1$, $Z_2$, $R_1$, $R_2$, $R_3$ and $R_4$ of the general formulae are same as defined above.

Condensation of the compounds (IV) and (V) can be carried out by adding an alkali such as sodium hydroxide and potassium hydroxide or an acid such as hydrochloric acid and sulfuric acid to a solution or a suspension of compounds (IV) and (V) in an organic solvent such as methanol, ethanol and ethyl acetate, and agitating the obtained mixture at 0° – 100°C. for some hours or for a few days. Produced condensates (I) are separated from the mother liquor and are purified, if necessary, by distillation, recrystallization or column chromatography.

The compounds represented by the general formulae (IV) and (V) in which $Z_1$ or $Z_2$ is 3-methyl-2-butenyloxy or 3,7-dimethyl-2,6-octadienyloxy group can be prepared by reaction of substituted acetophenone and substituted benzaldehyde, both having at least one hydroxy group, with 3-methyl-2-butenyl halide or 3,7-dimethyl-2,6-octadienyl halide in the presence of alkali.

On the other hand, the compounds represented by the general formulae (IV) and (V) in which $Z_1$ or $Z_2$ is 3-methyl-2-butenyl group can be synthesized by reaction of substituted acetophenone or substituted benzaldehyde with 3-methyl-2-butenyl halide, with 2-methyl-3-butene-2-ol in the presence of boron trifluoride etherate or with 1,1-dimethyl-π-allylnickel bromide, or by reaction of substituted acetophenone or substituted benzaldehyde, both having at least one hydroxy group, with 3-halogeno-3-methyl-1-butyne followed by reduction of obtained 1,1-dimethylpropargyl ether of each compound for obtaining 1,1-dimethylallyl ether thereof, further followed by thermal rearrangement.

Further, almost all compounds of this invention (Ia) can be synthesized by the reaction process (2).

the group consisting of the above described groups (II) and the other of $Y_1$ and $Y_2$ is one selected from the group consisting of the above described groups (II) and (III), each position of $Y_1$ and $Y_2$ corresponding to each position of $X_1$ and $X_2$, $R'_1$ and $R'_2$ are independently one selected from the group consisting of hydrogen atom and lower alkyl, lower alkoxy and acyloxy groups, $R'_3$ and $R'_4$ are independently one selected from the group consisting of hydrogen atom and hydroxy, lower alkyl, lower alkoxy and acyloxy groups with the proviso $R'_3$ or $R'_4$ is only in the ortho-positions to acetyl group when $R'_3$ or $R'_4$ is hydroxy group, and Hal is a halogen atom.

After condensation of the compounds (VI) and (VII) carried out in the same manner described in the reaction sequence (1), the condensates (VIII) are dissolved in an organic solvent such as acetone, methanol and ethanol and reacted with the compounds (IX) in the presence of an alkali such as potassium carbonate, sodium carbonate, potassium hydroxide and sodium ethoxide at room temperature or a refluxing temperature for obtaining the objective compound (Ia).

The compounds (VI) and (VII) may be prepared by reaction of substituted acetophenone or substituted benzaldehyde with 3-methyl-2-butenyl halide, with 2-methyl-3-butene-2-ol in the presence of boron trifluoride etherate or with 1,1-dimethyl-π-allylnickel bromide, or by reaction of substituted acetophenone or substituted benzaldehyde, both having at least one hydroxy group, with 3-halogeno-3-methyl-1-butyne followed by reduction of obtained 1,1-dimethylpropargyl ether of each compound for obtaining 1,1-dimethy-

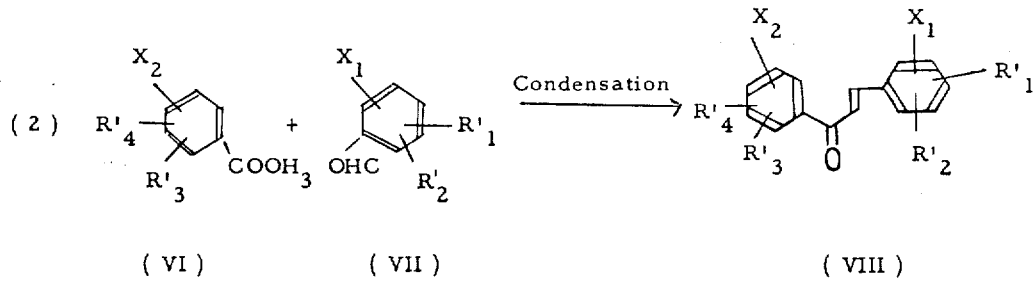

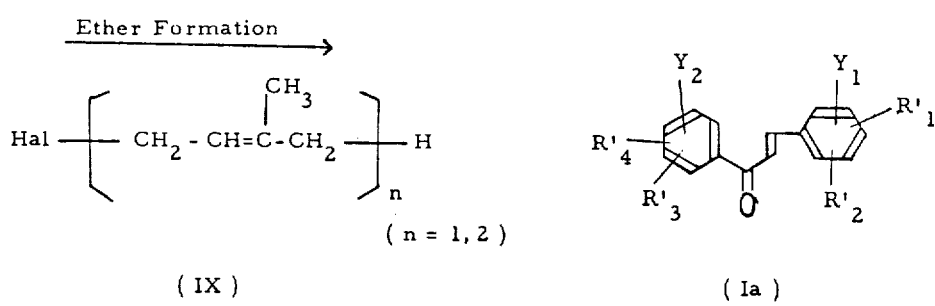

In this reaction sequence (2), one of $X_1$ and $X_2$ is hydroxy group and the other of $X_1$ and $X_2$ is one selected from the group consisting of hydroxy group and the above described groups (III) with the proviso $X_2$ is not in the ortho-positions to acetyl group when $X_2$ is hydroxy group, one of $Y_1$ and $Y_2$ is one selected from lallyl ether thereof further followed by thermal rearrangement.

Furthermore, several compounds within the scope of this invention represented by the following general formulae (Ib) and (Ic) may be prepared according to the processes (3A) and (3B), respectively.

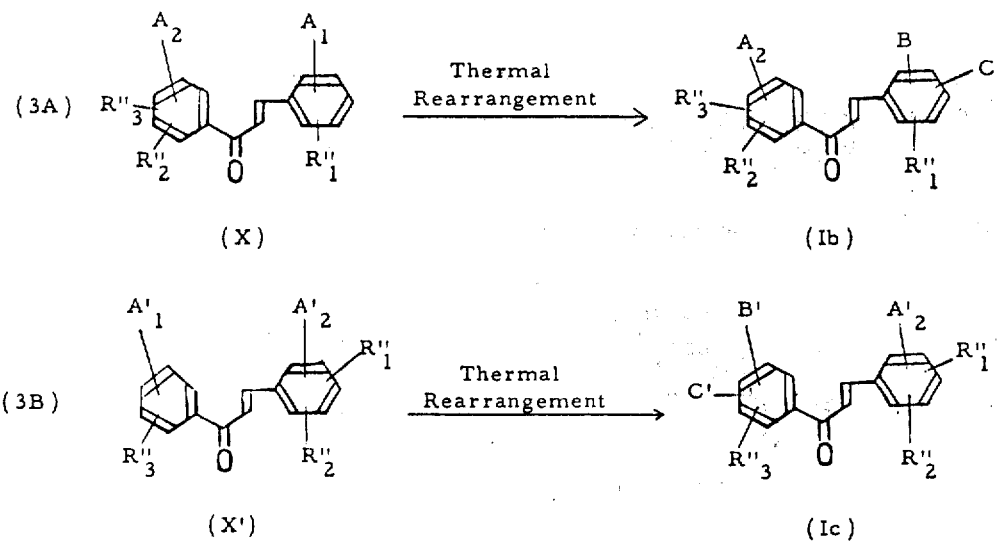

(3A) (X) Thermal Rearrangement → (Ib)

(3B) (X') Thermal Rearrangement → (Ic)

In this reaction sequences (3A) and (3B), $A_1$ and $A_1'$ are each 1,1-dimethylallyloxy group, $A_1'$ not being in 2' or 6' position, $A_2$ and $A_2'$ are independently one selected from the group consisting of the above described groups (II), B and B' are each hydroxy group, each position of B and B' corresponding to each position of $A_1$ and $A_1'$, C and C' are each 3-methyl-2-butenyl group being in each position neighboring to B and B', $R''_1$, $R''_2$ and $R''_3$ are independently one selected from the group consisting of hydrogen atom and hydroxy, lower alkyl, lower alkoxy and acyloxy groups with the proviso that $R''_1$ does not neighbor to $A_1$ when $A_1$ is in 2 or 6 position and simultaneously $R''_1$ is not hydrogen atom.

The intermediate compounds (X) or (X') dissolved or suspended in an organic solvent, for example, diethylaniline, dimethylformamide, dibutylamine, aniline or hexadecylamine or the compounds as they are without solvent, are heated at 100° – 200°C. for several hours under or not under nitrogen atmosphere to afford the objective compounds (Ib) and (Ic).

The compounds represented by the general formulae (X) and (X') can be prepared by condensation of substituted acetophenone with substituted benzaldehyde one of which is substituted by 1,1-dimethylallyloxy group, the other of which is substituted by 3-methyl-2-butenyloxy or 3,7-dimethyl-2,6-octadienyloxy group, by condensation of substituted acetophenone with substituted benzaldehyde one of which is substituted by 1,1-dimethylpropargyloxy group, the other of which is substituted by 3-methyl-2-butenyloxy or 3,7-dimethyl-2,6-octadienyloxy group, followed by reduction of 1,1-dimethylpropargyloxy group in the obtained condensate to 1,1-dimethylallyloxy group therein, or by reaction of substituted chalcone having 3-methyl-2-butenyloxy or 3,7-dimethyl-2,6-octadienyloxy group and at least one of hydroxy group with 3-halogeno-3-methyl-1-butyne, followed by reduction of 1,1-dimethylpropargyloxy group in the obtained substituted chalcone to 1,1-dimethylallyloxy group therein.

The compounds of this invention showed an excellent preventive or curative effect to the various types of experimental gastric ulcers in rats. That is, the present compounds accelerated the healing process of the chronic gastric ulcers induced by injection of acetic acid (acetic acid ulcer), inhibited ulcers and erosions formed by ligation of pylorus (Shay's ulcer) or by stressing animals by means of restraint and water immersion (stress ulcer) and also inhibited ulcer and erosions induced by administration of aspirin (aspirin ulcer). As general pharmacological activity, any unfavorable side effects have not yet observed in central nervous system and autonomic nervous system by the administration of the present compounds.

The compounds of this invention are effective to both acute and chronic gastric ulcer, accelerate reparation of injured gastric mucosal tissue, prevent gastric ulcer from occurring or from recurring and exhibit excellent healing effect to previously existing gastric ulcer. Further, the present compounds have weak suppresive activity to secretion of an aggressive factor to ulcer, such as hydrochloric acid or pepsin, however, do not show such side effects as observed in the administration of anti-cholinergic drugs.

In the present compounds, 3-methyl-2-butenyl group unit is considered to play an important role in mucosal resistance and tissue reparative activities. Thus, the compounds of this invention exhibit an excellent anti-gastric ulcer activity just by themselves, however, may be administered together with any other drugs, if necessary.

The toxicity of the present compounds is extremely low and no death was observed within 96 hours in mice and rats by administration of 5 g/Kg orally or 2 g/Kg intra-peritoneally, therefore, the compounds can be administered safely for long period without accompaning any side effects.

The compounds of this invention may be administered orally or parenterally for gastric and duodenal ulcers, gastric hyper acidity, acute and chronic gastritis, chronic constipation, chronic diarrhea, hypo gastralgia and any other gastric diseases. Dose for human; 20–150 mg/body.

As the especially useful compounds among the compounds represented by the general formula (I), the following compounds are described here, but are not intended as a limitation thereof.

| Compound No. | Chemical Structure and Name | boiling point or melting point |
|---|---|---|
| 1. | 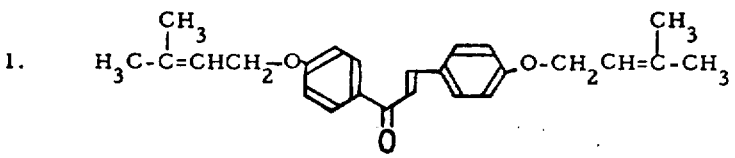<br>4,4'-bis-(3-methyl-2-butenyloxy)chalcone | m.p. 95° - 96°C.<br>b.p. 99° - 102°C.<br>(0.08 mmHg) |
| 2. | 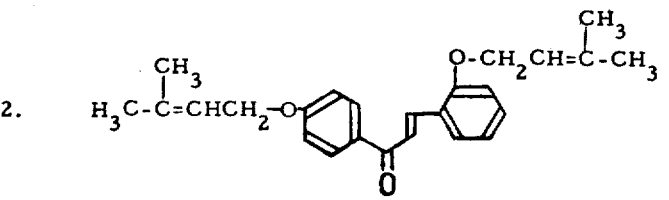<br>2,4'-bis-(3-methyl-2-butenyloxy)chalcone | m.p. 63°C.<br>b.p. 108° - 110°C<br>(0.1 mmHg) |
| 3. | 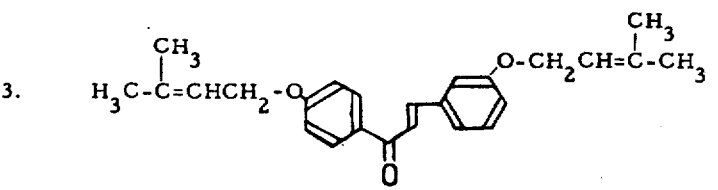<br>3,4'-bis-(3-methyl-2-butenyloxy)chalcone | b.p. 111° - 112°C.<br>(0.1 mmHg) |
| 4. | 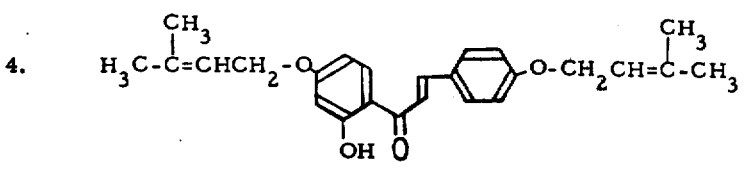<br>2'-hydroxy-4,4'-bis-(3-methyl-2-butenyloxy)chalcone | m.p. 87° - 88.5°<br>b.p. 109° - 114°C<br>(0.1 mmHg) |
| 5. | 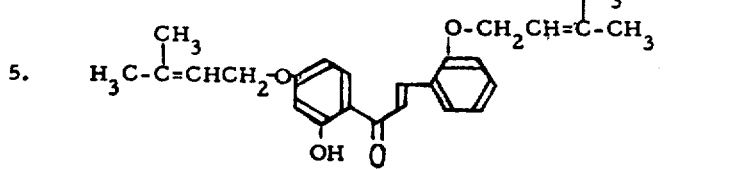<br>2'-hydroxy-2,4'-bis-(3-methyl-2-butenyloxy)chalcone | b.p. 110° - 112°C<br>(0.1 mmHg) |
| 6. | 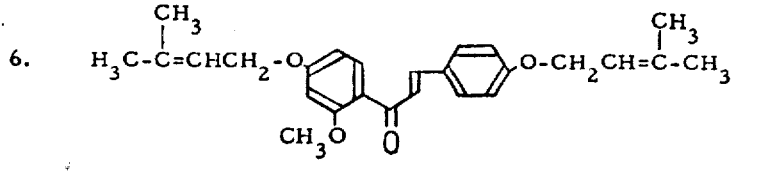<br>2'-methoxy-4,4'-bis-(3-methyl-2-butenyloxy)chalcone | b.p. 117° - 119°C.<br>(0.09 mmHg) |
| 7. | 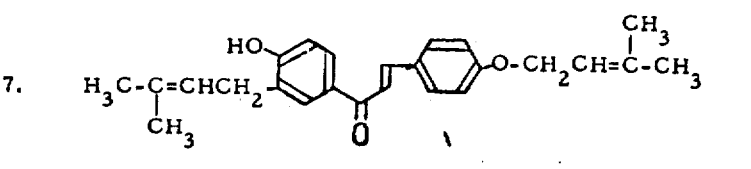<br>4'-hydroxy-3'-(3-methyl-2-butenyl)-4-(3-methyl-2-butenyloxy)chalcone | m.p. 145° - 147°C. |

8. 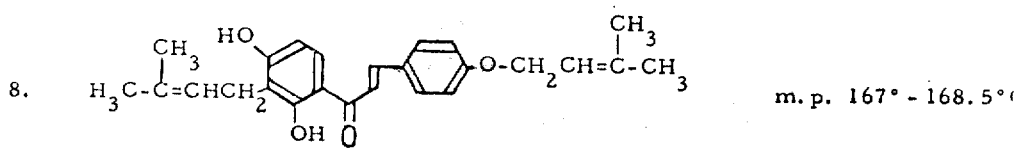   m.p. 167° - 168.5°C

2',4'-dihydroxy-3'-(3-methyl-2-butenyl)-4-(3-methyl-2-butenyloxy)chalcone

9. 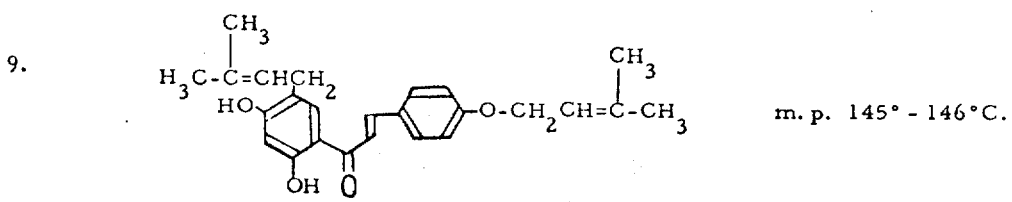   m.p. 145° - 146°C.

2',4'-dihydroxy-5'-(3-methyl-2-butenyl)-4-(3-methyl-2-butenyloxy)chalcone

10. 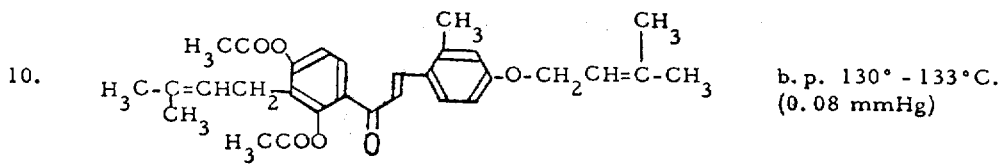   b.p. 130° - 133°C. (0.08 mmHg)

2',4'-diacetoxy-2-methyl-3'-(3-methyl-2-butenyl)-4-(3-methyl-2-butenyloxy)chalcone 11. 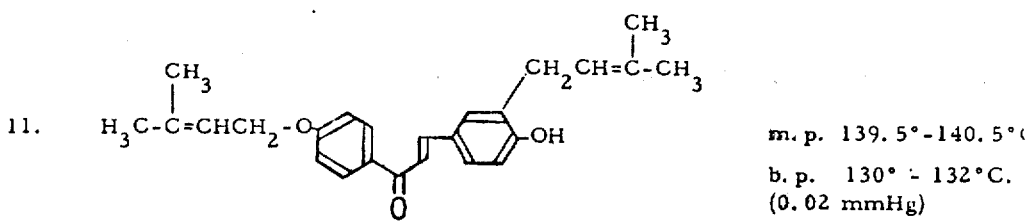   m.p. 139.5°-140.5°C
b.p. 130° - 132°C. (0.02 mmHg)

4-hydroxy-3-(3-methyl-2-butenyl)-4'-(3-methyl-2-butenyloxy)chalcone

12. 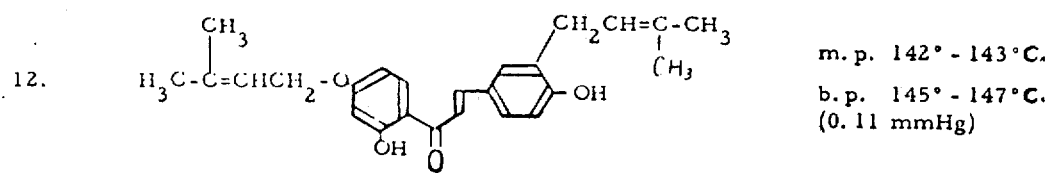   m.p. 142° - 143°C.
b.p. 145° - 147°C. (0.11 mmHg)

2',4-dihydroxy-3-(3-methyl-2-butenyl)-4'-(3-methyl-2-butenyloxy)chalcone

13. 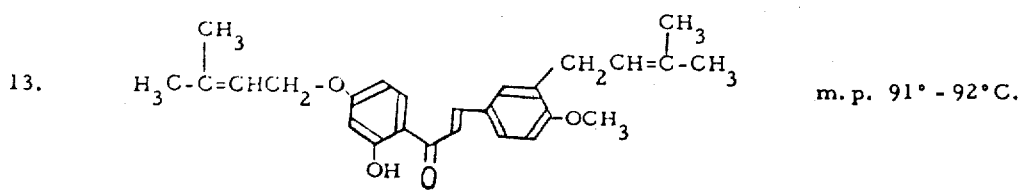   m.p. 91° - 92°C.

2'-hydroxy-4-methoxy-3-(3-methyl-2-butenyl)-4'-(3-methyl-2-butenyloxy)chalcone

14. 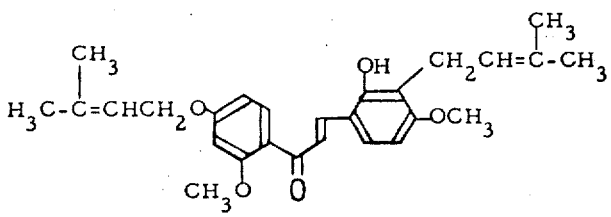
b.p. 131° - 133°C.
(0.09 mmHg)
2-hydroxy-2',4-dimethoxy-3-(3-methyl-2-butenyl)-4'-(3-methyl-2-butenyloxy)chalcone
15. 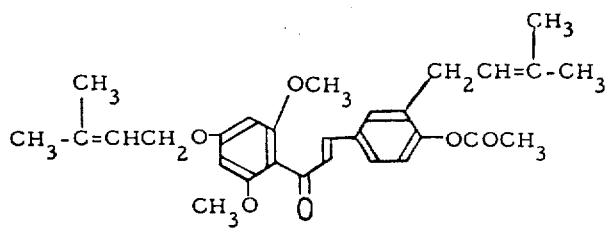
b.p. 129° - 131°C.
(0.09 mmHg)
4-acetoxy-2',6'-dimethoxy-3-(3-methyl-2-butenyl)-4'-(3-methyl-2-butenyloxy)chalcone
16. 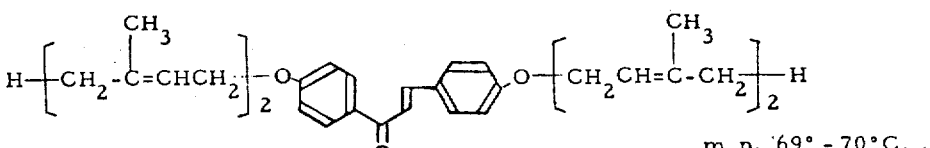
m.p. 69° - 70°C.
b.p. 114° - 116°C.
(0.06 mmHg)
4,4'-bis-(3,7-dimethyl-2,6-octadienyloxy)chalcone
17. 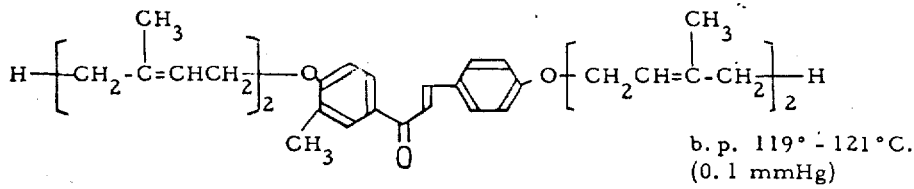
b.p. 119° - 121°C.
(0.1 mmHg)
3'-methyl-4,4'-bis-(3,7-dimethyl-2,6-octadienyloxy)chalcone
18. 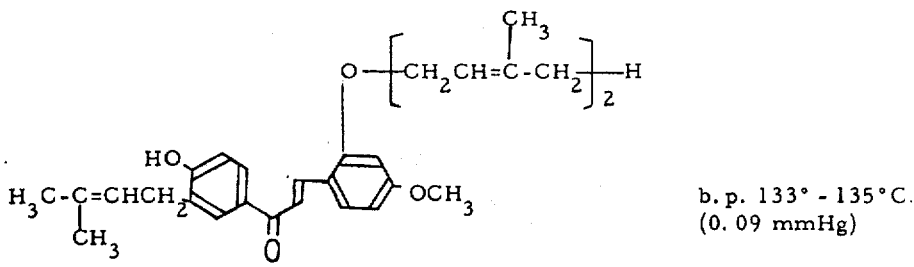
b.p. 133° - 135°C.
(0.09 mmHg)
4'-hydroxy-4-methoxy-3'-(3-methyl-2-butenyl)-2-(3,7-dimethyl-2,6-octadienyloxy)chalcone 19. 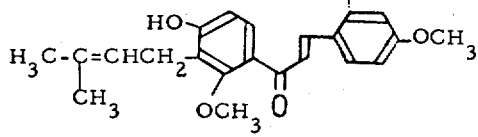

b. p. 131° - 133.5°C.
(0.09 mmHg)

4'-hydroxy-2',4-dimethoxy-3'-(3-methyl-2-butenyl)-2-(3,7-dimethyl-2,6-octadienyloxy)chalcone 20. 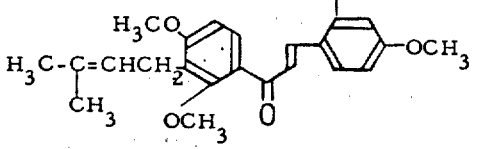

b. p. 122° - 125°C.
(0.08 mmHg)

2',4,4'-trimethoxy-3'-(3-methyl-2-butenyl)-2-(3,7-dimethyl-2,6-octadienyloxy)chalcone The following examples are illustrative of the present invention with further details and do not mean any limitation. In these examples, "g" signifies grams, and "ml" signifies milliliters.

EXAMPLE 1

A suspension of 218 mg of 4-(3-methyl-2-butenyloxy)acetophenone (IV) and 200 mg of 4-(3-methyl-2-butenyloxy)-benzaldehyde (V) in 8 ml of ethanol was added with 3 ml of 50% potassium hydroxide solution and was agitated for 1 hour at room temperature. After the reaction mixture was acidified with dilute hydrochloric acid, the solvent was evaporated. The obtained residue was extracted with each 30 ml of ether three times and the ether layer was washed with water, and dried with anhydrous sodium sulfate. After evaporation of ether, the residue was distilled under reduced pressure to give 333 mg of 4,4'-bis-(3-methyl-2-butenyloxy)chalcone (1), b.p. 99° - 102°C. (0.08 mmHg).

EXAMPLE 2

A mixture of 5 g of 4,4'-dihydroxychalcone (VIII) in 80 ml of acetone and 6.5 g of potassium carbonate was added with 8.5 g of 3-methyl-2-butenyl bromide (IX) whilst stirring and was agitated for 1 hour at room temperature. After filtration of potassium carbonate, almost all amount of acetone was evaporated. The residue was added with 300 ml of ether and further added with each 50 ml of 1% potassium carbonate solution three times to transfer unreacted 4,4'-dihydroxychalcone to water layer. The ether layer was washed with water, dried with anhydrous sodium sulfate and filtered. After removal of ether, the obtained residue was recrystallized with a mixture of acetone and methanol to afford 5.9 g of 4,4'-bis-(3-methyl-2-butenyloxy)chalcone (1), m.p. 95° - 96°C.

EXAMPLE 3

A solution of 3 g of salicylaldehyde in 20 ml of acetone was added with 4.1 g of potassium carbonate and 4.9 g of 3-methyl-2-butenyl bromide, then was agitated for 2 hours at room temperature to give 3.5 g of 2-(3- methyl-2-butenyloxy)benzaldehyde (V).

To a solution of 3.3 g of p-(3-methyl-2-butenyloxy)acetophenone (IV) and 3.0 g of obtained 2-(3-methyl-2-butenyloxy)benzaldehyde (V) in 5 ml of ethanol, 30 ml of 50% potassium hydroxide solution was added, then the mixture was agitated for 3 hours at room temperature. After addition of 200 ml of water, the reaction mixture was acidified with hydrochloric acid, extracted with ether. The ether layer was distilled under reduced pressure to give 3.6 g of 2,4'-bis-(3-methyl-2-butenyloxy)chalcone (2), b.p. 108° – 110°C. (0.1 mmHg), m.p. 63°C.

EXAMPLE 4

A solution of 3.3 g of p-(3-methyl-2-butenyloxy)acetophenone (IV) and 3.0 g of m-(3-methyl-2-butenyloxy)benzaldehyde (V) in 5 ml of ethanol was added with 30 ml of 50% potassium hydroxide solution and was agitated for 3 hours at room temperature. After addition of water, the reaction mixture was acidified with hydrochloric acid and extracted with ether. The ether layer was distilled under reduced pressure to give 3.1 g of 3,4'-bis-(3-methyl-2-butenyloxy)chalcone (3), b.p. 111° – 112°C. (0.1 mmHg).

EXAMPLE 5

A suspension of 260 mg of 2-hydroxy-4-(3-methyl-2-butenyloxy)acetophenone (IV) and 219 mg of 4-(3-methyl-2-butenyloxy)benzaldehyde (V) in 8 ml of ethanol was added with 3 ml of 50% potassium hydroxide solution and was agitated for 1 hour at room temperature. After the reaction mixture was acidified with hydrochloric acid, the solvent was evaporated. The obtained residue was extracted with each 30 ml of ether three times and the ether layer was separated, washed with water and dried with anhydrous sodium sulfate. After evaporation of ether, the residue was distilled under reduced pressure to give 390 mg of 2'-hydroxy-4,4'-bis-(3-methyl-2-butenyloxy)chalcone (4), b.p. 109° – 114°C. (0.1 mmHg).

EXAMPLE 6

To a mixture of 5 g of 2',4,4'-trihydroxychalcone (VIII) in 80 ml of acetone and 6.6 g of potassium carbonate, 8.7 g of 3-methyl-2-butenyl bromide (IX) was added dropwise whilst stirring, then the mixture was agitated for 3 hours at room temperature. After potassium carbonate in the reaction mixture was filtered off, almost all amount of acetone was evaporated. To the obtained residue, 300 ml of ether was added and further each 50 ml of 1% potassium hydroxide solution was added three times to transfer unreacted 2',4,4'4,-4'-trihydroxychalcone (VIII) into water layer. The ether layer was washed with water, dried with anhydrous sodium sulfate and filtered successively. Ether was evaporated off and the obtained residue was recrystallized from acetone-methanol mixture to give 5.3 g of 2'-hydroxy-4,4'-bis-(3-methyl-2-butenyloxy)chalcone (4), m.p. 87° – 88.5°C.

EXAMPLE 7

To a mixture of 5 g of 2,2',4'-trihydroxychalcone (VIII) in 50 ml of methanol and 10 g of sodium carbonate, 14 g of 3-methyl-2-butenyl chloride (IX) was added dropwise whilst stirring, then the mixture was refluxed for 1 hour. After sodium carbonate was filtered off, methanol was evaporated. The obtained residue was extracted with ether, washed with water and dried with anhydrous sodium sulfate successively. Then, ether was evaporated off and the residue was distilled under reduced pressure giving 4.7 g of 2'-hydroxy-2,4'-bis-(3-methyl-2-butenyloxy)chalcone (5), b.p. 110° – 112°C. (0.1 mmHg).

EXAMPLE 8

A solution of 130 mg of 2-methoxy-4-(3-methyl-2-butenyloxy)acetophenone (IV) and 120 mg of p-(3-methyl-2-butenyloxy)benzaldehyde (V) in 2 ml of ethanol was added with 3 ml of 50% potassium hydroxide solution and was agitated at room temperature for 1 hour. After the reaction mixture was acidified with dilute hydrochloric acid, the solvent was evaporated off. The obtained residue was extracted with ether and the ether layer was washed with water and dried with anhydrous sodium sulfate. After removal of ether, the residue was distilled under reduced pressure to give 130 mg of 2'-methoxy-4,4'-bis-(3-methyl-2-butenyloxy)chalcone (6), b.p. 117° – 119°C. (0.09 mmHg).

EXAMPLE 9

To a solution of 418 mg of 4-hydroxy-3-(3-methyl-2-butenyl)acetophenone (IV) and 390 mg of 4-(3-methyl-2-butenyloxy)benzaldehyde (V) in 2 ml of ethanol, 20 ml of 50% potassium hydroxide solution was added, then the mixture was agitated for 3 hours at room temperature. After addition of water, the reaction mixture was acidified to PH 2 with dilute hydrochloric acid and extracted with ether. The solvent was evaporated off and the obtained residue was column chromatographed on silica gel with acetone-hexane mixture affording 310 mg of colorless powder, 4'-hydroxy-3'-(3-methyl-2-butenyl)-4-(3-methyl-2butenyloxy)chalcone (7), m.p. 145° – 147°C.

EXAMPLE 10

A solution of 6.0 g of p-(1,1-dimethylallyloxy)acetophenone and 6.1 g of p-(3-methyl-2-butenyloxy)benzaldehyde in 25 ml of ethanol was added with 230 g of 50% potassium hydroxide solution and was agitated at room temperature for 3 hours. The obtained condensate, 9.8 g of 4'-(1,1-dimethylallyloxy)-4-(3-methyl-2-butenyloxy)chalcone (X') was dissolved in 70 ml of diethylaniline and was agitated at 140°C. for 4 hours under nitrogen atmosphere.

As a result, 8.8 g of 4'-hydroxy-3'-(3-methyl-2-butenyl)-4-(3-methyl-2-butenyloxy)chalcone (7), m.p. 145° – 147°C., was obtained.

EXAMPLE 11

A solution of 5.8 g of p-(1,1-dimethylpropargyloxy)acetophenone and 6.0 g of p-(3-methyl-2-butenyloxy)benzaldehyde in 15 ml of ethanol was added with 200 g of 50% potassium hydroxide solution and was agitated at room temperature. The obtained condensate, 7.7 g of 4'-(1,1-dimethylpropargyloxy)-4-(3-methyl-2-butenyloxy)chalcone was dissolved in 75 ml of benzene and was hydrogenated by addition of 1.5 g of Lindlar catalyst to get 7.5 g of 4'-(1,1-dimethylallyloxy)-4-(3-methyl-2-butenyloxy)chalcone (X'), b.p. 125° – 126°C. (0.1 mmHg). Then, 7.4 g of the same compound was dissolved in 50 ml of diethylaniline and was agitated at 140°C. for 3 hours under nitrogen atmosphere. Recrystallization of the obtained compound from acetone-hexane mixture gave 5.8 g of 4'-hydroxy-3'-(3-methyl-2-betenyl)-4-(3-methyl-2-butenyloxy)chalcone (7), m.p. 145°–147°C.

EXAMPLE 12

To a suspension of 440 mg of 2,4-dihydroxy-3-(3-methyl-2-butenyl)acetophenone (IV) and 380 mg of p-(3-methyl-2-butenyloxy)benzaldehyde (V) in 2 ml of ethanol, 8 ml of 40% potassium hydroxide solution was added, then the mixture was agitated for 72 hours at room temperature. After addition of water, the reaction mixture was acidified to pH 2 with dilute hydrochloric acid and extracted with ether. The solvent was evaporated off and the obtained residue was column chromatographed on silica gel with benzene to give 95 mg of yellow needles, 2',4'-dihydroxy-3'-(3-methyl-2-butenyl)-4-(3-methyl-2-butenyloxy)chalcone (8), m.p. 167° – 168.5°C.

EXAMPLE 13

A solution of 6.4 g of 2-hydroxy-4-(1,1-dimethylpropargyloxy)acetophenone and 5.4 g of p-(3-methyl-2-butenyloxy)benzaldehyde in 25 ml of ethanol was added with 234 g of 50% potassium hydroxide solution and was agitated at room temperature for 8 hours. The obtained condensate, 8.5 g of 2'-hydroxy-4-(3-methyl-2-butenyloxyl)-4'-(1,1-dimethylpropargyloxy)chalcone was dissolved in 85 ml of benzene and was hydrogenated by addition of 1.7 g of Lindlar catalyst to give 8.4 g of 2'-hydroxy-4'-(1,1-dimethylallyloxy)-4-(3-methyl-2-butenyloxy)chalcone (X') b.p. 122° - 124°C. (0.09 mmHg). The obtained compound in 8.3 g was dissolved in 60 ml of diethylaniline and was agitated at 130°C. for 4 hours under nitrogen atmosphere.

After recrystallization of the obtained compound from acetone-hexane mixture, 5.5 g of 2',4'-dihydroxy-3'-(3-methyl-2-butenyl)-4-(3-methyl-2-butenyloxy)-chalcone (8), m.p. 167° – 168.5°C., was obtained.

EXAMPLE 14

A solution of 7.3 g of 2',4'-dihydroxy-4-(3-methyl-2-butenyloxy)chalcone and 3.5 g of potassium carbonate in 45 ml of dimethylformamide was agitated at room temperature for 3 hours under nitrogen atmosphere, then was heated at 80°C. and added with 5.7 g of 3-chloro-3-methyl-1-butyne dropwise whilst stirring. Agitation of the mixture was further continued for 7 hours at the same temperature. The obtained 2.9 g of 2'-hydroxy-4-(3-methyl-2-butenyloxy)-4'-(1,1-dimethylpropargyloxy)chalcone was dissolved in 40 ml of benzene and was hydrogenated in the presence of 0.3 g of Lindlar catalyst for obtaining 2.88 g of 2'-hydroxy-4'-(1,1-dimethylallyloxy)-4-(3-methyl-2-butenyloxy)-chalcone (X'). The whole amount of this compound was dissolved in 75 ml of diethylaniline and was agitated at 130°C. for 5 hours under nitrogen atmosphere to afford 2.11 g of 2',4' -dihydroxy-3'-(3-methyl-2-butenyl)-4-(3-methyl-2-butenyloxy)chalcone (8), m.p. 167° – 168.5°C.

EXAMPLE 15

To a suspension of 660 mg of 2,4-dihydroxy-5-(3-methyl-2-butenyl)acetophenone (IV) and 571 mg of p-(3-methyl-2-butenyloxy)benzaldehyde (V) in 3 ml of ethanol, 12 ml of 40 % potassium hydroxide solution was added, then the mixture was agitated for 1 hour at 60°C. The same process as Example 12 was carried out to give 280 mg of orange needles, 2',4'-dihydroxy-5'-(3-methyl-2-butenyl)-4-(3-methyl-2-butenyloxy)chalcone (9), m.p. 145° – 146°C.

EXAMPLE 16

A solution of 9.9 g of 2,4-diacetoxy-3-(3-methyl-2-butenyl)acetophenone (IV) and 9.6 g of 2-methyl-4-(3-methyl-2-butenyloxy)benzaldehyde (V) in 160 ml of anhydrous ethyl acetate was saturated with hydrogen chloride gas at 0°C. and was agitated for 12 hours at the same temperature. Then, the solvent was evaporated off on water bath. After cooling, the obtained residue was dissolved in ether and the ether solution was washed with water and dried with anhydrous sodium sulfate, then, ether was removed by evaporation. The obtained residue was charged on silica gel column and eluted with acetone-hexane mixture to afford 2.1 g of 2',4'-diacetoxy-2-methyl-3'-(3-methyl-2-butenyl)-4-(3-methyl-2-butenyloxy)chalcone (10), b.p. 130° – 133°C. (0.08 mmHg).

EXAMPLE 17

A suspension of 170 mg of 4-(3-methyl-2-butenyloxy)acetophenone and 159 mg of 4-(1,1-dimethylpropargyloxy)benzaldehyde in 8 ml of ethanol was added with 3 ml of 50% potassium hydroxide solution and was agitated for 1 hour at room temperature. After the reaction mixture was acidified with hydrochloric acid, the solvent was evaporated off. The obtained residue was extracted with each 30 ml of ether three times. The ether layer was washed with water and dried with anhydrous sodium sulfate. After evaporation of ether, the residue was distilled under reduced pressure to give 247 mg of 4-(1,1-dimethylpropargyloxy)-4'-(3-methyl-2-butenyloxy)chalcone, b.p. 109° – 113°C. (0.06 mmHg).

To a suspension of 240 mg of thus obtained compound in 7 ml of benzene, 50 mg of Lindlar catalyst was added and the mixture was agitated for 1 hour to hydrogenate the compound. After the filtration of the reaction mixture, benzene was removed by evaporation giving 4-(1,1-dimethylallyloxy)-4'-(3-methyl-0385 2-butenyloxy)chalcone (X), to which 10 ml of diethylaniline was added. -methyl- The mixture was agitated for 5 hours at 120° – 125°C. After cooling, the reaction mixture was poured into ice-cooled dilute hydrochloric acid to get acidic condition and extracted with ether. The extract was washed with dilute hydrochloric acid, water and saturated sodium chloride solution successively, and dried with anhydrous sodium sulfate. Ether was removed by evaporation and the obtained residue was distilled under reduced pressure to afford 155 mg of 4-hydroxy-3-(3-methyl-2-butenyl)-4'-(3-methyl-2-butenyloxy)chalcone (11), b.p. 130° – 132°C. (0.02 mmHg), m.p. 139.5° – 140.5°C.

EXAMPLE 18

A solution of 6.2 g of 2-hydroxy-4-(3-methyl-2-butenyloxy)acetophenone and 5.2 g of p-(1,1-dimethylallyloxy)benzaldehyde in 25 ml of ethanol was added with 230 g of 50% potassium hydroxide solution and was agitated at room temperature for 6 hours. The obtained condensate, 8.8 g of 2'-hydroxy-4-(1,1-dimethylallyloxy)-4'-(3-methyl-2-butenyloxy)chalcone (X) was dissolved in 60 ml of diethylaniline and was agitated at 130°C. for 4 hours under nitrogen atmosphere. After recrystallization of the obtained compound from acetone-hexane mixture, 7.1 g of 2',4'-dihydroxy-3-(3-methyl-2-butenyl)-4'-(3-methyl-2-butenyloxy)chalcone (12), m.p. 142° – 143°C., b.p. 145° – 147°C. (0.11 mmHg), was obtained.

EXAMPLE 19

A solution of 3.1 g of 2-hydroxy-4-(3-methyl-2-butenyloxy)acetophenone (IV) and 3.2 g of 4-methoxy-3-(3-methyl-2-butenyl)benzaldehyde (V) in 6 ml of ethanol was added with 30 ml of 50% potassium hydroxide solution and was agitated for 3 hours at room temperature. After the reaction mixture was acidified with dilute hydrochloric acid, the solvent was evaporated off. The obtained residue was extracted with ether and the ether layer was washed with water and dried with anhydrous sodium sulfate. After removal of ether, the resulting residue was recrystallized from methanol-acetone mixture to give 4.7 g of yellow needles of 2'-hydroxy-4-methoxy-3-(3-methyl-2-butenyl)-4'-(3-methyl-2-butenyloxy)chalcone (13), m.p. 91° – 92°C.

EXAMPLE 20

A solution of 3.2 g of 2-methoxy-4-(3-methyl-2-butenyloxy)acetophenone (IV) and 3.4 g of 2-hydroxy-4-methoxy-3-(3-methyl-2-butenyl)benzaldehyde (V) in 6 ml of ethanol was added with 30 ml of 50% potassium hydroxide solution and was agitated for 3 hours at room temperature. After the reaction mixture was acidified with dilute hydrochloric acid, the solvent was evaporated off. The obtained residue was extracted with ether and the ether layer was washed with water and dried with anhydrous sodium sulfate. After removal of ether, the residue was distilled under reduced pressure to give 4.5 g of 2-hydroxy-2',4-dimethoxy-3-(3-methyl-2-butenyl)-4'-(3-methyl-2-butenyloxy)chalcone (14), b.p. 131° – 133°C. (0.09 mmHg).

EXAMPLE 21

A solution of 7.6 g of 2,6-dimethoxy-4-(3-methyl-2-butenyloxy)acetophenone (IV) and 7.0 g of 4-acetoxy-3-(3-methyl-2-butenyl)benzaldehyde (V) in 140 ml of anhydrous ethyl acetate was added with 40 ml of 40% sulfuric acid solution and was agitated for 6 hours at 0°C. After the solvent was evaporated off, the obtained residue was added with water and was extracted with ether. The extract was washed with water, dried with anhydrous sodium sulfate, then ether was evaporated off. The obtained residue was distilled under reduced pressure to afford 1.9 g of 4-acetoxy-2',6'-dimethoxy-3-(3-methyl-2-butenyl)-4'-(3-methyl-2-butenyloxy)-chalcone (15), b.p. 129° - 131°C. (0.09 mmHg).

EXAMPLE 22

A solution of 2.7 g of p-(3,7-dimethyl-2,6-octadienyloxy)acetophenone (IV) and 2.6 g of p-(3,7-dimethyl-2,6-octadienyloxy)benzaldehyde (V) in 10 ml of ethanol was added with 30 ml of 50% sodium hydroxide solution and was agitated for 1 hour at 50°C. After addition of cold water, the reaction mixture was acidified with hydrochloric acid and extracted with ether. The ether layer was distilled under reduced pressure to give 3.2 g of 4,4'-bis-(3,7-dimethyl-2,6-octadienyloxy)chalcone (16), b.p. 114° – 116°C. (0.06 mmHg), m.p. 69° – 70°C.

EXAMPLE 23

To a mixture of 3 g of 4,4'-dihydroxy-3'-methylchalcone (VIII) in 60 ml of acetone and 3.9 g of potassium carbonate, 15 g of 3,7-dimethyl-2,6-octadienyl bromide (IX) was added dropwise whilst stirring, then the mixture was agitated for 3 hours at room temperature. After the reaction mixture was filtered to remove sodium carbonate, acetone was evaporated off. The obtained residue was extracted with ether and the ethereal layer was washed with water and dried with anhydrous sodium sulfate. Ether was removed by evaporation and the obtained residue was distilled under reduced pressure to give 4.5 g of 3'-methyl-4,4'-bis-(3,7-dimethyl-2,6-octadienyloxy)chalcone (17), b.p. 119° – 121°C. (0.1 mmHg).

EXAMPLE 24

A solution of 3.3 g of 4'-hydroxy-4-methoxy-2-(3,7-dimethyl-2,6-octadienyloxy)chalcone and 5.5 g of potassium hydroxide in 23 ml of dimethylformamide was added dropwise with 4.2 g of 3-bromo-3-methyl-1-butyne under heating at 80°C. whilst stirring and was agitated for 7 hours at the same temperature. The obtained 1.7 g of 4-methoxy-2-(3,7-dimethyl-2,6-octadienyloxy)-4'-(1,1-dimethylpropargyloxy)chalcone was dissolved in 25 ml of benzene and was hydrogenated in the presence of 0.2 g of Lindlar catalyst to give 1.6 g of 4-methoxy-4'-(1,1-dimethylallyloxy)-2-(3,7-dimethyl-2,6-octadienyloxy)chalcone (X'). The whole amount of this compound was dissolved in 45 ml of diethylaniline and was agitated at 140°C. for 5 hours under nitrogen atmosphere to afford 1.3 g of 4'-hydroxy-4-methoxy-3'-(3-methyl-2-butenyl)-2-(3,7-dimethyl-2,6-octadienyloxy)chalcone (18), b.p. 133°– 135°C. (0.09 mmHg).

EXAMPLE 25

A solution of 6.1 g of 2-methoxy-4-(1,1-dimethylpropargyloxy)acetophenone and 8.3 g of 4-methoxy-2-(3,7-dimethyl-2,6-octadienyloxy)benzaldehyde in 20 ml of ethanol was added with 220 g of 50% potassium hydroxide solution and was agitated at 60°C. for 1 hour. The obtained condensate, 9.2 g of 2',4-dimethoxy-2-(3,7-dimethyl-2,6-octadienyloxy)-4'-(1,1-dimethylpropargyloxy)chalcone was dissolved in 100 ml of benzene and was hydrogenated in the presence of 1.9 g of Lindlar catalyst for obtaining 9.1 g of 2',4-dimethoxy-4'-(1,1-dimethylallyloxy)-2-(3,7-dimethyl-2,6-octadienyloxy)chalcone (X'). Whole amount of this compound was dissolved in 65 ml of diethylaniline and was agitated at 150°C. for 5 hours under nitrogen atmosphere to afford 5.1 g of 4'-hydroxy-2',4-dimethoxy-3'-(3-methyl-2-butenyl)-2(3,7-dimethyl-2,6-octadienyloxy)chalcone (19), b.p. 131° – 133.5°C. (0.09 mmHg).

EXAMPLE 26

A solution of 3 g of 2,4-dimethoxy-3-(3-methyl-2-butenyl)acetophenone (IV) and 3.5 g of 4-methoxy-2-(3,7-dimethyl-2,6-octadienyloxy)benzaldehyde (V) in 10 ml of methanol was added with 40 ml of 50% potassium hydroxide solution and was agitated for 3 hours at room temperature. After addition of water, the reaction mixture was acidified with hydrochloric acid and extracted with ether. The extract was distilled under reduced pressure to give 3.7 g of 2',4,4'-trimethoxy-3'-(3-methyl-2-butenyl)-2-(3,7-dimethyl-2,6-octadienyloxy)chalcone (20), b.p. 122° – 125°C, (0.08 mmHg).

EXAMPLE I

Acute toxicity of the compounds was investigated in male rats of Wyster strain weighing 130 to 150 g and in male mice of ddy strain weighing 13 to 15 g. A single dose of 5 g/Kg orally or 2 g/Kg intra-peritoneally was administered in mice and rats. Then, animals died within 96 hours after administration were counted. A degree of acute toxicity was expressed as mortality rate (animals died × 100 / animals used). Obtained mortality rate of each compound was zero.

EXAMPLE II

Anti-gastric ulcer activities of the present compounds were tested according to Takagi's acetic acid ulcer method (Japanese Journal of Pharmacology 19, 418 (1969)).

Male rats of Donryu strain weighing 230 to 250 g were used for screening curative effect of the present compound on chronic gastric ulcers induced by means of submucosal injection of acetic acid.

Animals were laparotomized under ether anesthesia and injected with 0.01 ml of 20% acetic acid between the serosa and the muscular layer of the pyloric antrum. After surgery, the abdomen was closed and animals were fed normally. The testing drugs were perorally administered twice in a day for ten days from two days after the operation and animals were sacrificed at twelfth day from the operation in order to assess the healing process of the ulcer. Each stomach was removed, filled with 15 ml of 1% formalin solution and placed in the same solution for about 10 minutes to fix the outer layer of the gastric wall according to Brodie's method (Gastroenterology 38, 353 (1960)).

Then, the stomach was cut open along the greater curvature and examined grossly for lesions. The area of the produced ulcer was designated as ulcer index.

Using the ulcer index, curative ratio of ulcer was calculated from the following equation:
Curative ratio (%) = 100 $(C - S)/C$,
wherein $C$ is ulcer index of control, $S$ is ulcer index of sample.

In Table 1, obtained curative ratio of each compound was shown.

EXAMPLE III

Another anti-gastric ulcer activity test was conducted by Shay's ulcer method (Gastroenterology 5, 43 (1945)).

Male rats of Donryu strain weighing 200 to 230 g were used for screening the preventive effect of the present compound to so-called Shay's ulcer produced by ligation of pylorus. Preceeding the operation, animals fasted for 48 hours except water ad libitum. Under ether anesthesia, mid ventral line of the animal was incised and the pylorus was ligated. Then, the abdomen was closed and the testing drugs were administered intraperitoneally. After 15 hours from the operation, animals were killed by ether. The esophagus was ligated and the stomach was carefully removed. Volume of gastric juice was measured and lesions at the portion of the forestomach were macroscopically examined. The areas of ulcers and erosions were measured and the sum of both was designated as ulcer index.

Using ulcer index, preventive ratio of ulcer was calculated from the following equation:
Preventive ratio (%) = 100 $(C - S)/C$,
wherein $C$ is ulcer index of control, $S$ is ulcer index of sample.

In Table 1, obtained ulcer index of each compound was summarized, together with preventive ratio of gastric juice secretion (%), which was calculated by the same manner as preventive ratio of ulcer.

EXAMPLE IV

Anti-gastric ulcer activity of the present compounds was investigated by Takagi's stress ulcer method (Japanese Journal of Pharmacology 18, 9 (1968)).

Male rats of Donryu strain weighing 260 to 300 g were used for screening preventive effect of the present compound to gastric ulcer produced by means of restraint and water immersion.

Animals were placed and immobilized in the stress cage and immersed vertically to the xyphoid of the animal in a water bath at 23°C. for 7 hours. The testing drugs were intra-peritoneally administered 30 minutes before the restraint.

At the end of the stress period, animals were removed from water bath, released from the stress cage and kill by a blow. The stomach was removed and inflated with 15 ml of 1% formalin solution and placed in the same solution for about 10 minutes to fix the outer layer of the gastric wall according to Brodie's method. Then, the stomach was cut open along the greater curvature and lesions were examined macroscopically. The areas of ulcers and erosions were measured and the sum of both was designated as ulcer index.

From the equation described in Example III, each preventive ratio (%) was calculated and indicated in Table I.

EXAMPLE V

Selecting aspirin as a drug which often brings about gastric ulcers, anti-gastric ulcer activity of the present compound was investigated.

Male Donryu strain rats weighing 200 to 300 g were used for the examination of preventive effect to aspirin-induced gastric ulcers.

Animals were treated by aspirin administration of each 200 mg/Kg perorally in three times at 2 hours' interval. The testing drugs were perorally administered 30 minutes before an initial aspirin administration. Two hours later from final aspirin administration, animals were sacrificed by a blow and each stomach was removed and inflated with about 15 ml of 1% formalin solution and placed in 1 % formalin solution. Ten minutes later, the stomach was cut open along the greater curvature and the areas of ulcers and erosions were measured. The sum of both was designated as ulcer index and each preventive ratio (%) was calculated by the same manner as described in Example II and was shown in Table 1.

Table I

Curative Ratio of Acetic Acid Ulcer, Preventive Ratio of Shay's Ulcer, Stress Ulcer, Aspirin-induced Ulcer and Preventive Ratio of Gastric Juice Secretion in the Case of Shay's Ulcer in Rat

| Compound No. | Dose (mg/Kg) | Number of Animals | Curative Ratio of Acetic Acid Ulcer (%) | Gastric Juice Secretion in the Case of Shay's Ulcer (%) | Preventive Ratio of Shay's Ulcer (%) | Stress Ulcer (%) | Aspirin Ulcer (%) |
|---|---|---|---|---|---|---|---|
| 1 | 100 | 6 |  | 29.1 | 83.7 |  |  |
|  | 50 | 10 | 75.0 | 30.9 | 59.0 | 89.5 |  |
|  | 20 | 10 | 55.1 | 21.8 | 44.8 | 69.5 |  |
|  | 10 | 10 | 44.4 | 25.5 | 40.6 | 75.9 |  |
| 2 | 50 | 7 |  | 25.5 | 94.1 |  | 60.3 |
|  | 30 | 7 |  |  | 95.1 |  |  |
| 4 | 100 | 6 |  | 30.9 | 95.4 |  |  |
|  | 50 | 10 | 51.1 | 23.6 | 78.2 | 83.6 |  |
|  | 20 | 10 | 27.7 | 25.5 | 66.1 | 68.6 |  |
|  | 10 | 10 |  | 20.0 | 43.5 | 37.3 |  |
| 7 | 5 | 6 |  | 25.5 | 33.1 |  |  |
|  | 50 | 5 |  | 17.9 | 85.6 | 74.2 |  |
|  | 100 | 6 |  | 43.6 | 94.6 |  |  |
| 8 | 50 | 10 | 61.7 | 47.3 | 99.2 | 67.3 |  |
|  | 20 | 10 | 42.6 | 21.8 | 93.3 | 57.2 |  |
|  | 10 | 10 |  | 16.4 | 86.2 | 32.3 |  |
| 9 | 5 | 6 |  | 16.4 | 80.3 |  |  |
| 11 | 50 | 5 |  | 52.7 | 98.5 |  |  |
| 12 | 50 | 7 |  | 21.8 | 82.8 |  |  |
| 16 | 50 | 5 |  | 21.4 | 76.7 |  |  |
|  | 30 | 7 | 54.1 | 23.6 | 63.2 |  | 52.1 |

What we claim is:

1. A chalcone ether represented by the formula (I)

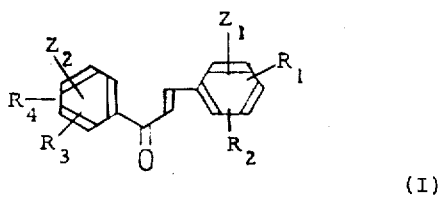

(I)

wherein $R_1$, $R_2$, $R_3$ and $R_4$ are independently a member selected from the group consisting of hydrogen, hydroxy, alkyl of 1–5 carbons, alkoxy of 1–5 carbons and alkanoyloxy of 1–5 carbons and one of $Z_1$ and $Z_2$ is a member selected from the group consisting of the groups represented by the formula (II)

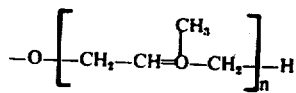

(II)

wherein $n$ is 1 or 2 and the other of $Z_1$ and $Z_2$ is a member selected from the group consisting of the groups represented by the formula (II) and (III)

(III)

2. A chalcone ether according to claim 1, 4,4'-bis-(3-methyl-2-butenyloxy)chalcone.

3. A chalcone ether according to claim 1, 2,4'-bis-(3-methyl-2-butenyloxy)chalcone.

4. A chalcone ether according to claim 1, 3,4'-bis-(3-methyl-2-butenyloxy)chalcone.

5. A chalcone ether according to claim 1, 2'-hydroxy-4,4'-bis-(3-methyl-2-butenyloxy)chalcone.

6. A chalcone ether according to claim 1, 2'-hydroxy-2,4'-bis-(3-methyl-2-butenyloxy)chalcone.

7. A chalcone ether according to claim 1, 2'-methoxy-4,4'-bis-(3-methyl-2-butenyloxy)chalcone.

8. A chalcone ether according to claim 1, 4'-hydroxy-3'-(3-methyl-2-butenyl)-4-(3-methyl-2-butenyloxy)chalcone.

9. A chalcone ether according to claim 1, 2',4'-dihydroxy-3'-(3-methyl-2-butenyl)-4-(3-methyl-2-butenloxy)chalcone.

10. A chalcone ether according to claim 1, 2',4'-dihydroxy-5'-(3-methyl-2-butenyl)-4-(3-methyl-2-butenyloxy)chalcone.

11. A chalcone ether according to claim 1, 2',4'-diacetoxy-2-methyl-3'-(3-methyl-2-butenyl)-4-(3-methyl-2-butenyloxy)chalcone.

12. A chalcone ether according to claim 1, 4-hydroxy-3-(3-methyl-2-butenyl)-4'-(3-methyl-2-butenyloxy)chalcone.

13. A chalcone ether according to claim 1, 2', 4-dihydroxy-3-(3-methyl-2-butenyl)-4'-(3-methyl-2-butenyloxy)chalcone.

14. A chalcone ether according to claim 1, 2'-hydroxy-4-methoxy-3-(3-methyl-2-butenyl)-4'-(3-methyl-2-butenloxy)chalcone.

15. A chalcone ether according to claim 1, 2-hydroxy-2', 4-dimethoxy-3-(3-methyl-2-butenyl)-4'-(3-methyl-2-butenyloxy)chalcone.

16. A chalcone ether according to claim 1, 4-acetoxy-2',6'-dimethoxy-3-(3-methyl-2-butenyl)-4'(3-methyl-2-butenyloxy)chalcone.

17. A chalcone ether according to claim 1, 4,4'-bis-(3,7-dimethyl-2,6-octadienyloxy)chalcone.

18. A chalcone ether according to claim 1, 3'-methyl-4,4'-bis-(3,7-dimethyl-2,6-octadienyloxy)chalcone.

19. A chalcone ether according to claim 1, 4'-hydroxy-4-methoxy-3'(3-methyl-2-butenyl)-2-(3,7-dimethyl-2,6-octadienyloxy)chalcone.

20. A chalcone ether according to claim 1, 4'hydroxy-2',4-dimethoxy-3'-(3-methyl-2-butenyl)-2-(3,7-dimethyl-2,6-octadienyloxy)chalcone.

21. A chalcone ether according to claim 1, 2',4,4'-trimethoxy-3'-(3-methyl-2-butenyl)-2-(3,7-dimethyl-2,6-octadienyloxy)chalcone.

* * * * *